United States Patent
Huang et al.

(10) Patent No.: US 10,171,275 B2
(45) Date of Patent: Jan. 1, 2019

(54) WIRELESS TRANSMITTER, WIRELESS REMOTE RECEIVER AND METHODS THEREOF

(71) Applicant: Beken Corporation, Shanghai (CN)

(72) Inventors: Yiming Huang, Shanghai (CN); Weifeng Wang, Shanghai (CN)

(73) Assignee: BEKEN CORPORATION, Shanghai (CN)

( * ) Notice: Subject to any disclaimer, the term of this patent is extended or adjusted under 35 U.S.C. 154(b) by 110 days.

(21) Appl. No.: 15/361,410

(22) Filed: Nov. 26, 2016

(65) Prior Publication Data

US 2018/0139311 A1    May 17, 2018

(30) Foreign Application Priority Data

Nov. 11, 2016    (CN) .......................... 2016 1 0997373

(51) Int. Cl.
*H04L 27/00* (2006.01)
*H04L 27/12* (2006.01)

(52) U.S. Cl.
CPC .......... *H04L 27/0002* (2013.01); *H04L 27/12* (2013.01)

(58) Field of Classification Search
None
See application file for complete search history.

(56) References Cited

U.S. PATENT DOCUMENTS

| | | | | |
|---|---|---|---|---|
| 8,401,120 B1* | 3/2013 | Ozgur | ....................... | H04L 1/00 375/329 |
| 8,489,720 B1* | 7/2013 | Morford | ............. | H04L 41/0896 709/223 |
| 2007/0036247 A1* | 2/2007 | Capretta | ................. | H04L 27/22 375/343 |
| 2011/0030025 A1* | 2/2011 | Bertonis | .......... | H04N 21/43637 725/118 |
| 2012/0106679 A1* | 5/2012 | Ruijter | ................ | H04L 25/0262 375/340 |
| 2012/0257619 A1* | 10/2012 | Yeh | .......................... | H04L 47/28 370/389 |
| 2017/0126558 A1* | 5/2017 | Kwon | .................. | H04N 21/234 |

* cited by examiner

*Primary Examiner* — Nicholas Sloms
(74) *Attorney, Agent, or Firm* — Perkins Coie LLP (57) ABSTRACT

A wireless transmitter, comprises a frame generator configured to generate a frame by including an auxiliary preamble, an auxiliary syncword, a guard, a preamble, an address, a packet control, a payload and a CRC; a modulator communicatively coupled to the frame generator and configured to modulate the frame according to a variable transmission rate and include the transmission rate in the auxiliary syncword; and a RF front end communicatively coupled to the modulator and configured to transmit the modulated signal to a receiver.

12 Claims, 6 Drawing Sheets

WIRELESS TRANSMITTER, WIRELESS REMOTE RECEIVER AND METHODS THEREOF

CLAIM OF PRIORITY

This application claims priority to Chinese Application number 201610997373.X entitled "wireless transmitter, wireless remote receiver and methods thereof," filed on Nov. 11, 2016 by Beken Corporation, which is incorporated herein by reference.

TECHNICAL FIELD

The present application relates to telecommunication and more particularly, but not exclusively, to a wireless transmitter, a wireless remote receiver and methods thereof.

BACKGROUND

Conventionally, most wireless remote control devices require the users to pre-configure the wireless remote control device to work in the mode of transmission rate of 1 Megabit per second (Mbps) or 2 Mbps. If the user wants to switch the transmission rate, the user needs to stop the transmission, and manually switch the transmission rate. With the growing demands for the wireless remote control device to transmit image signals, the conventional transmission rate cannot meet the requirements. The wireless remote control device may need higher transmission rates, such as 4 Mbps or even 6 Mbps. Due to the conflict between transmission rate and sensitivity, the higher the transmission rate, the lower the sensitivity. The conventional high-end wireless remote control device (such as civil Unmanned Aerial Vehicle, or UAV) requires a transmission rate of 1 Mbps for transmitting control signals, and using the transmission rate of 4 Mbps or 6 Mbps (clearer image signal) for transmitting the image signal. It is impossible to manually switch the transmission rate for such equipment. Therefore it is desirable to devise a method and device that can solve the above problems.

SUMMARY

According to an embodiment of the invention, a wireless transmitter comprises a frame generator configured to generate a frame by including an auxiliary preamble, an auxiliary syncword, a guard, a preamble, an address, a packet control, a payload and an error correction; a modulator communicatively coupled to the frame generator and configured to modulate the frame according to a variable transmission rate and include the transmission rate in the auxiliary syncword; and a RF front end communicatively coupled to the modulator and configured to transmit the modulated signal to a receiver.

According to another embodiment of the invention, a wireless remote receiver comprises a RF front end configured to receive a signal; a demodulator communicatively coupled to the RF front, and configured to determine a transmission rate for the demodulator according to the auxiliary syncword within the signal, wherein the transmission rate is variable, wherein the demodulator is further configured to output a demodulated frame by demodulating the payload according to the transmission rate determined from the auxiliary syncword, wherein the demodulated frame includes an auxiliary preamble, an auxiliary syncword, a guard, a preamble, an address, a packet control, a payload and an error correction.

According to another embodiment of the invention, a method in a wireless transmitter, comprises generating, by an frame generator, a frame by including an auxiliary preamble, an auxiliary syncword, a guard, a preamble, an address, a packet control, a payload and an error correction; modulating, by a modulator communicatively coupled to the frame generator, the frame according to a variable transmission rate and including the transmission rate in the auxiliary syncword; and transmitting, by a RF front end communicatively coupled to the modulator, the modulated signal to a receiver.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Various aspects and examples of the invention will now be described. The following description provides specific details for a thorough understanding and enabling description of these examples. Those skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. Certain terms may even be emphasized below, however, any terminology intended to be interpreted in any restricted manner will be overtly and specifically defined as such in this Detailed Description section.

Figure 1:
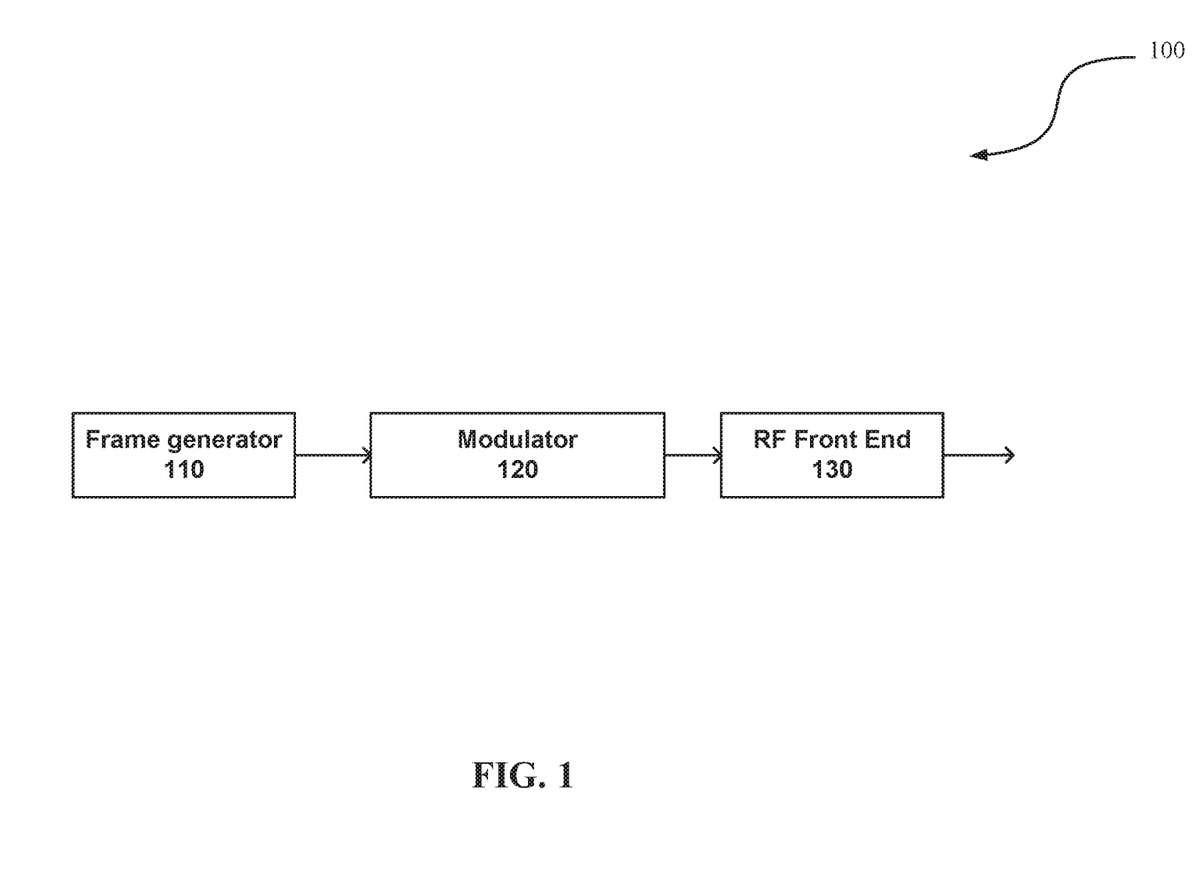
FIG. 1 is a block diagram for a wireless transmitter for transmitting wireless signal according to an embodiment of the invention.

FIG. 1 is a block diagram for a wireless transmitter 100 for transmitting wireless signal according to an embodiment of the invention.

The wireless transmitter 100 comprises a frame generator 110, a modulator 120, and a radio frequency (RF) end 130. The frame generator 110 generates a frame by including an auxiliary preamble, an auxiliary syncword, a guard, a preamble, an address, a packet control, a payload and an error correction. The frame generator 110 for example, may be a 2.4 GHz proprietary frame generator that integrates the function of a frame synthesizer. The modulator 120 is communicatively coupled to the frame generator 110. The modulator 120 modulates the frame according to a variable transmission rate and include the transmission rate in the auxiliary syncword. The RF front end 130 is communicatively coupled to the modulator 120 and transmits the modulated signal to a receiver.

Alternatively, the frame comprises the auxiliary preamble, wherein a demodulator of a receiver is configured to use the auxiliary preamble to synchronize the demodulator of the receiver to the incoming bit stream and for frequency offset calculation. For example, the demodulator includes the function of demodulation synchronization, which can also be referred to as frame synchronization. The demodulator uses auxiliary preamble and auxiliary syncword to find frame header of the incoming bit stream, and perform frame synchronization. The frame header may comprise the first bit of the auxiliary preamble.

Alternatively, the frame further comprises a guard field, wherein the receiver is configured to use the guard field for rate switch. For example, both the RF end and the demodulator uses the guard field for rate switch.

Alternatively, the auxiliary syncword comprises 3 bytes, and the auxiliary preamble comprises 1 byte. The auxiliary syncword and the auxiliary preamble will be discussed further below with respect to FIG. 2.

Alternatively, the transmission rate of the auxiliary preamble, the auxiliary syncword and the guard is fixed to 1 Mbps.

Alternatively, the transmission rate of the preamble, the address, the packet control, the payload and the error correction is adapt to be selected from 1 Mbps, 4 Mbps or, 6 Mbps.

Figure 2:
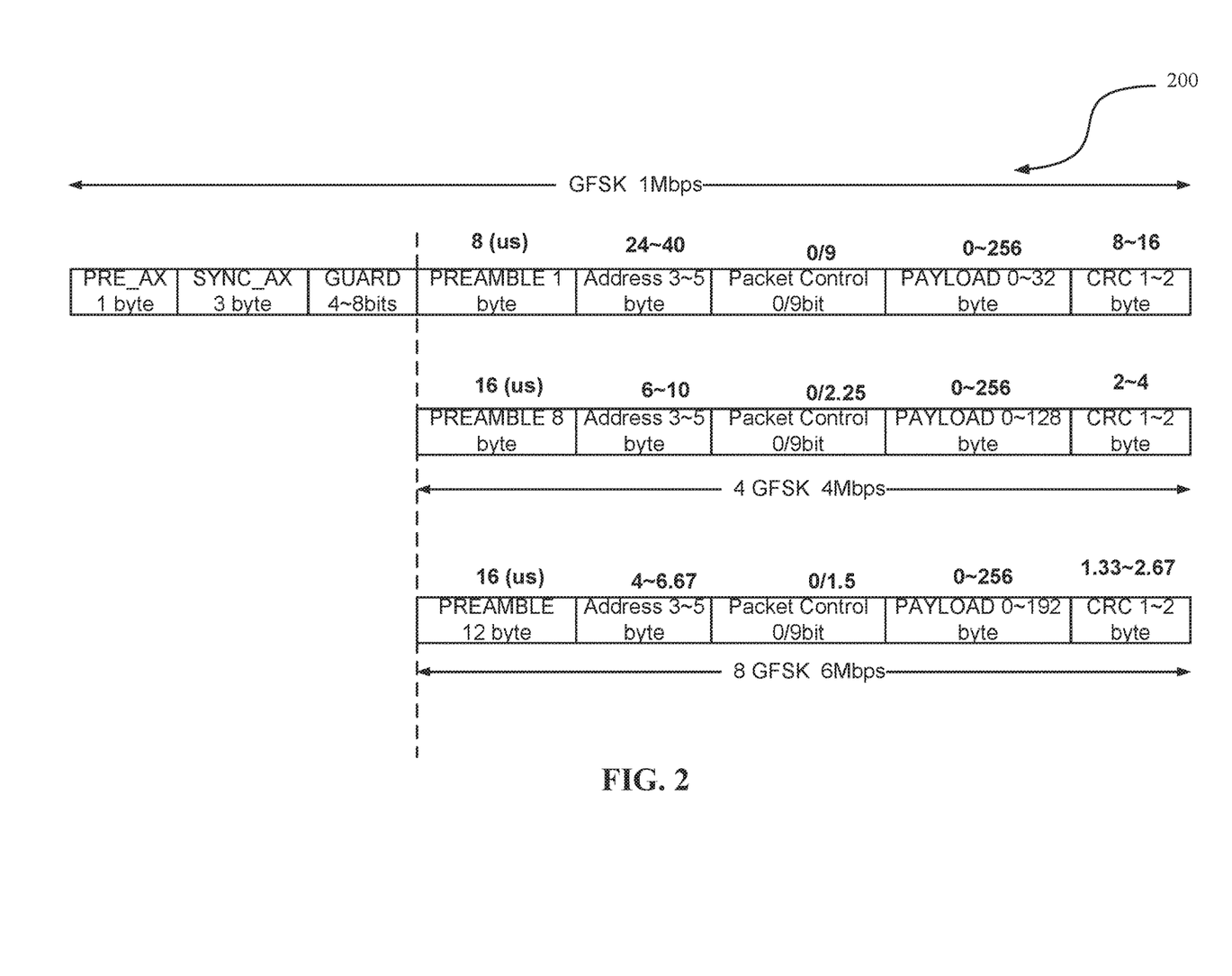
FIG. 2 is a frame structure according to an embodiment of the invention.

FIG. 2 is a frame structure 200 according to an embodiment of the invention. FIG. 2 shows a frame structure 200 for a Gaussian frequency-shift keying (GFSK) frame. The GFSK frame 200 comprises an auxiliary preamble PRE_AX, an auxiliary syncword SYNC_AX, and a GUARD which are transmitted at a fixed transmission rate of 1 Mbps. The auxiliary preamble PRE_AX may be used for aiding auxiliary synword SYNC_AX for synchronization of a demodulator at a receiver end to incoming bit streams, as well as for aiding frequency offset calculation at the receiver end. Since the average value of auxiliary preamble Pre_AX represents the size of frequency offset of crystal oscillator, the demodulation process needs to subtract the average value of the auxiliary preamble Pre_AX so to correctly decide the value for the auxiliary synword SYNC_AX. For example, a receiver may generate a frequency offset value by averaging a plurality of auxiliary preambles, or can be represented with the equation: frequency offset value=mean(auxiliary preamble). When a first bit of SYNC_AX is 0, the auxiliary preamble PRE_AX is "01010101" or when the first bit of SYNC_AX is 1, the auxiliary preamble PRE_AX is "10101010."

An RF front end of a receiver is configured to use the auxiliary syncword SYNC_AX to synchronize the receivers demodulator to the incoming bits stream and assist determining the demodulation rate. In other words, the receiver determines different demodulation rates, such as 1 Mbps, 4 Mbps or 6 Mbps, based on the selected auxiliary syncword SYNC_AX. Table 1 below shows example auxiliary syncword Sync_AX bit patterns for 1 Mbps, 4 Mbps, and 6 Mbps respectively. Note the bit patterns shown in Table 1 are for illustrative purpose only, and are not intended to limit the scope of the embodiments of the invention.

TABLE 1

| No. | Example Sync_AX bit patterns |
|---|---|
| 1 | 1 Mbps SYNC_AX = [1 0 0 1 0 0 1 0 1 0 1 1 0 0 1 1 0 0 1 0 1 1 1 1] |
| 2 | 4 Mbps SYNC_AX = [1 1 0 0 0 0 1 0 1 1 1 0 0 1 0 1 0 0 0 1 1 0 1 1] |
| 3 | 6 Mbps SYNC_AX = [0 0 1 0 1 1 0 1 0 0 0 1 1 0 0 0 1 1 0 0 0 1 0 0] |

The field Guard in FIG. 2 is to guarantee a sufficient guarding time for transmission rate switching.

After the auxiliary preamble PRE_AX, the auxiliary syncword SYNC_AX, and the Guard which are transmitted at a fixed transmission rate of 1 Mbps, the frame further comprises a part that can be transmitted with variable transmission rate, which are marked with GFSK 1 Mbps, GFSK 4 Mbps, and GFSK 6 Mbps. The following description will go through the fields with variable transmission rated.

In FIG. 2, for the 1 Mbps mode frame structure, the preamble field is used for synchronizing principal demodulation and another frequency offset estimation. Further, for example, when the first bit in the Address is 0, the preamble may be "01010101," or when the first bit of the Address is 1, the preamble may be "10101010." Due to latency in transmission, the correlation between the first bit of the address and the value of the preamble may ensure the stability and accuracy of the preamble value.

The Address field in FIG. 2 indicates the address of the receiver. An address ensures that the packet is detected by the target receiver. The address field can be configured to have a length of 3, 4, or 5 bytes.

Figure 3:
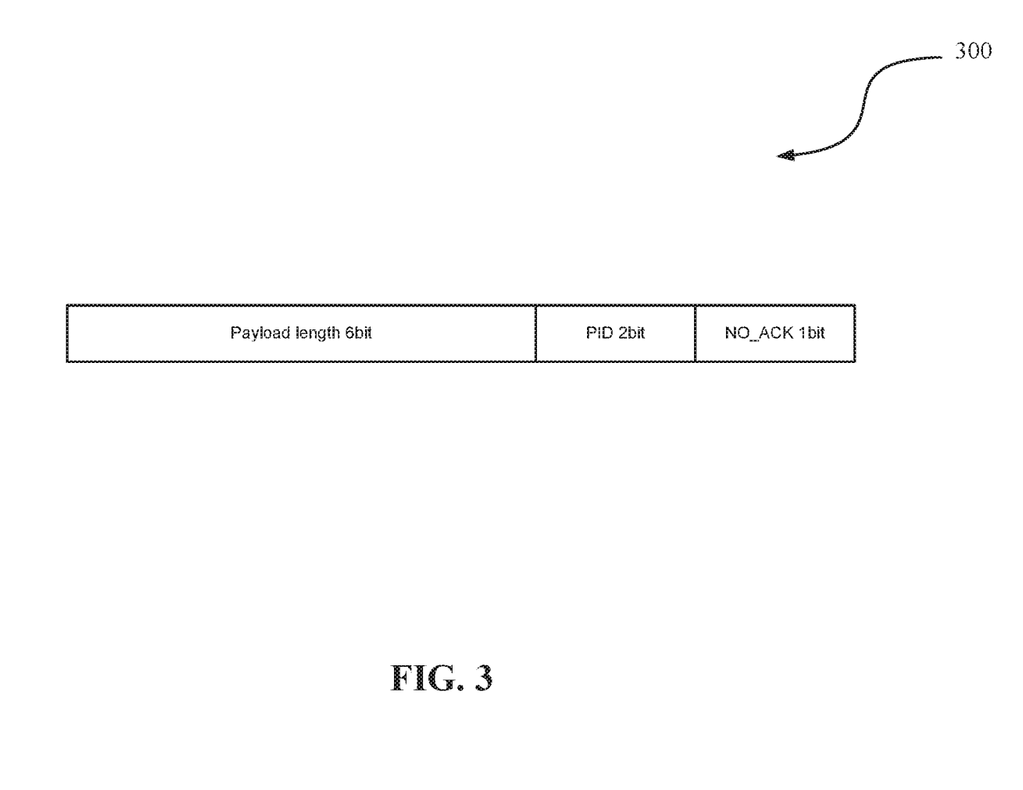
FIG. 3 is a diagram illustrating the packet control field according to an embodiment of the invention.

The Packet Control field in FIG. 2 can be used for the control of packet length and the control of the number of packets, as discussed further in conjunction with FIG. 3.

FIG. 3 is a diagram illustrating the packet control field according to an embodiment of the invention. The packet control field may comprise 9 bits. Among the 9 bits, a first 6 bit field specifies the length of the payload in bytes, which is referred to as payload length. The length of the payload can vary from 0 to 32 bytes. Then 2 bit Packet Identifier (PID) field is used to detect if the received packet is new or retransmitted. The last 1-bit flag is only used when the auto acknowledgement feature is used. For example, setting the flag high (or 1) tells the receiver that the packet does not use auto acknowledged.

Referring back to FIG. 2, Payload field means the data payload for the packet. The payload is the user-defined contents of the packet. It can be 0 to 32 bytes wide and is transmitted on-air as it is uploaded (unmodified) to the device.

Cyclic redundancy check (CRC) field in FIG. 2 represents the check field. The CRC is an error detection mechanism in the packet. It may be either 1 or 2 bytes and is calculated based on the address, the Packet Control Field, and Payload.

For example, the polynomial for 1 byte CRC is $X^8+X^2+X+1$, with an initial value of 0xFF. Alternatively, the polynomial for 2 byte CRC is $X^{16}+x^{12}+x^5+1$, with an initial value of 0xFFFF.

In FIG. 2, for 4 Mbps mode, the preamble for 4 Mbps may have the following value: P1=[3 3 −3 −3 3 3 −3 −3 3 3 −3 −3 3 3 −3 −3 3 3 −3 −3 3 3 −3 −3 3 3 −3 −3 3 3 −3 −3], if the first symbol of the address is 3, or P2=[−3 −3 3 3 −3 −3 3 3 −3 −3 3 3 −3 −3 3 3 −3 −3 3 3 −3 −3 3 3 −3 −3 3 3 −3 −3 3 3], if the first symbol of the address is −3.

The first four bytes of the 4 Mbps preamble are used for synchronizing principal demodulation and automatic gain control (AGC), and the last four bytes of the 4 Mbps preamble are used for calculating demodulation threshold [−slice_thd 0 slice_thd], wherein slice_thd=⅔*mean(abs (last four bytes))). For example, the value of slice_thd may be determined during demodulation dynamically according to the above equation. In an embodiment, the receiver needs to decide the data flow as any of −3, −1, 1, 3, based on the three threshold −slice_thd, 0 and slice_thd. If the data flow is smaller than −slice_thd, the receiver decide the data flow to be −3. If the data flow is smaller than 0 and larger than −slice_thd, the receiver decide the data flow to be −1. If the data flow is smaller than slice_thd and larger than 0, the receiver decide the data flow to be 1. If the data flow is larger than slice_thd, the receiver decide the data flow to be 3.

Wherein Address, Packet Control, Payload and CRC in 4 Mbps mode is similar to 1 Mbps mode, which may vary in length.

The function "Abs" means to determine the absolute value. The function "Mean" is used to determine the average value.

For 6 Mbps mode, the preamble field may take the follow values:

P1=[7 7 −7 −7 7 7 −7 −7 7 7 −7 −7 7 7 −7 −7 7 7 −7 −7 7 7 −7 −7 7 7 −7 −7 7 7 −7 −7 7 7 −7 −7], the first symbol of the address is 7; or P2=[−7 −7 7 7 −7 −7 7 7 −7 −7 7 7 −7 −7 7 7 −7 −7 7 7 −7 −7 7 7 −7 −7 7 7 −7 −7 7 7 −7 −7 7 7 7], the first symbol of the address is −7.

The first six bytes of the 6 Mbps preamble are used for synchronizing principal demodulation and automatic gain control (AGC), and the last six bytes of the 6 Mbps preamble are used for calculating demodulation threshold([−3*slice_thd −2*slice_thd −slice_thd 0 slice_thd 2*slice_thd 3*slice_thd], wherein slice_thd=²⁄₇*mean(abs(las six bytes))).

Wherein Address, Packet Control, Payload and CRC in 6 Mbps mode is similar to 1 Mbps mode, which may vary in length.

Both 4 Mbps mode and 6 Mbps use Gray code for mapping.

The following Table 2 shows the mapping for 4 Mbps.

TABLE 2

| Decimal | Binary | Mapping to Gray code |
|---|---|---|
| 0 | 00 | Mapping to 1 |
| 1 | 01 | Mapping to 3 |
| 2 | 10 | Mapping to −1 |
| 3 | 11 | Mapping to −3 |

The following Table 2 shows the mapping for 6 Mbps.

TABLE 3

| Decimal | Binary | Mapping to Gray code |
|---|---|---|
| 0 | 000 | Mapping to 1 |
| 1 | 001 | Mapping to 3 |
| 2 | 010 | Mapping to 7 |
| 3 | 011 | Mapping to 5 |
| 4 | 100 | Mapping to −1 |
| 5 | 101 | Mapping to −3 |
| 6 | 110 | Mapping to −7 |
| 7 | 111 | Mapping to −5 |

Figure 4:
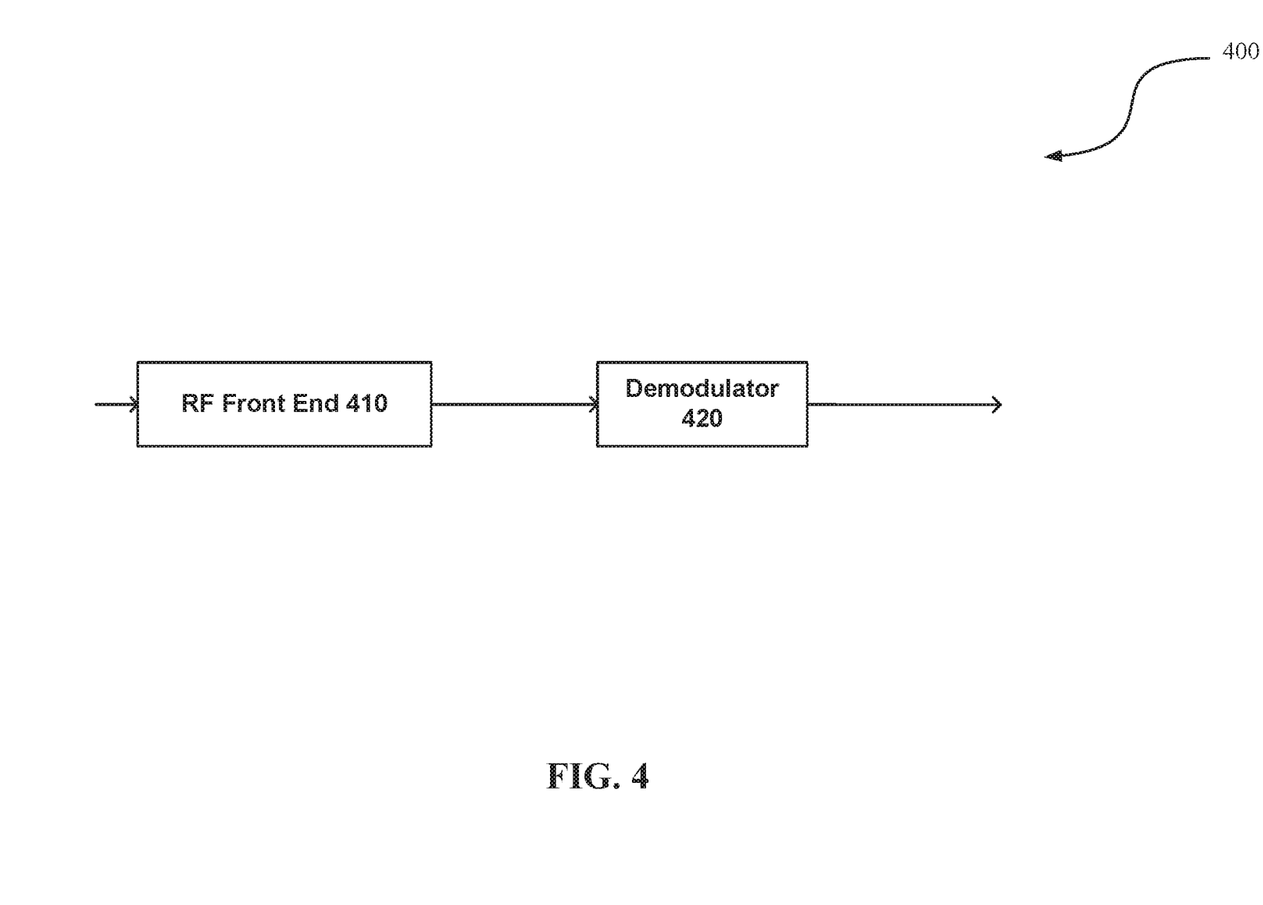
FIG. 4 is a block diagram for a wireless remote receiver for receiving signals from a wireless transmitter according to an embodiment of the invention.

FIG. 4 is a block diagram for a wireless remote receiver 400 for receiving signals from the wireless transmitter 100 shown in FIG. 1 according to an embodiment of the invention. The wireless remote receiver 400 comprises an RF front end 410 and a demodulator 420. The RF front end 410 receives a signal. The signal is a modulated signal. The demodulator 420 is communicatively coupled to the RF front 410. The demodulator 420 determines a transmission rate for the demodulator according to the auxiliary syncword within the signal, wherein the transmission rate is variable. The demodulator 420 further outputs a demodulated frame by demodulating the payload according to the transmission rate determined from the auxiliary syncword. The demodulated frame includes an auxiliary preamble, an auxiliary syncword, a guard, a preamble, an address, a packet control, a payload and a CRC. Note the receiver 400 does not know the transmission rate before the demodulation. Instead, the demodulator 410 in the receiver 400 starts demodulation at a fixed 1 Mbps speed (as the Auxiliary data is fixed at 1 Mbps). When the auxiliary syncword is correctly demodulated, the receiver 400 can determine the transmission rate (such as 1 Mbps, 4 Mbps, or 6 Mbps) from the preamble to the CRC including the payload as shown in FIG. 2, depending on the value of the auxiliary syncword. Therefore the demodulator 410 switches to the appropriate transmission rate to continue later demodulation during the guard time.

Alternatively, the wireless remote receiver 400 further comprises a calculator (not shown in FIG. 4) communicatively coupled to RF front end 410. The calculator aids frequency offset calculation and aids synchronous demodulation by using the auxiliary preamble. For example, the calculator may generate a frequency offset value by averaging a plurality of auxiliary preambles, or frequency offset value=mean(auxiliary preamble).

Alternatively, the signal further comprises a guard field, wherein the RF front end 410 is configured to use the guard field for rate switch.

Alternatively, syncword comprises 3 bytes, and the auxiliary preamble comprises 1 byte.

Alternatively, each bit in the preamble is encoded using a Gray code.

Alternatively, the transmission rate is selected from 1 Mbps, 4 Mbps or, 6 Mbps.

Figure 5:
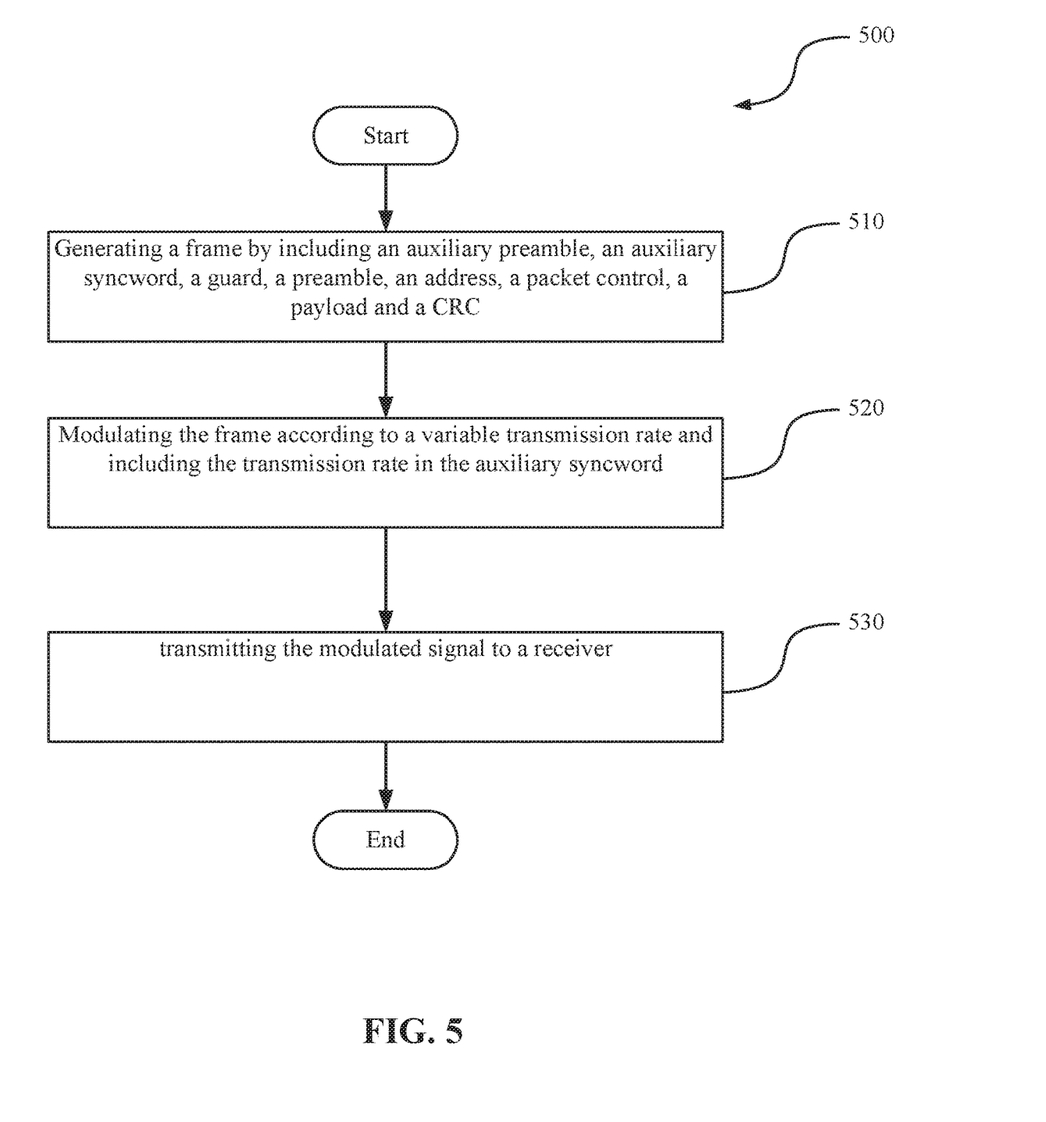
FIG. 5 is a flowchart illustrating a method in a wireless transmitter according to an embodiment of the invention.

FIG. 5 is a flowchart illustrating a method 500 in a wireless transmitter according to an embodiment of the invention.

The method 500 in a wireless transmitter comprises generating, by an frame generator in block 510, a frame by including an auxiliary preamble, an auxiliary syncword, a guard, a preamble, an address, a packet control, a payload and a CRC; modulating, by a modulator communicatively coupled to the frame generator in block 520, the frame according to a variable transmission rate and including the transmission rate in the auxiliary syncword; and transmitting, by a RF front end communicatively coupled to the modulator in block 530, the modulated signal to a receiver.

Figure 6:
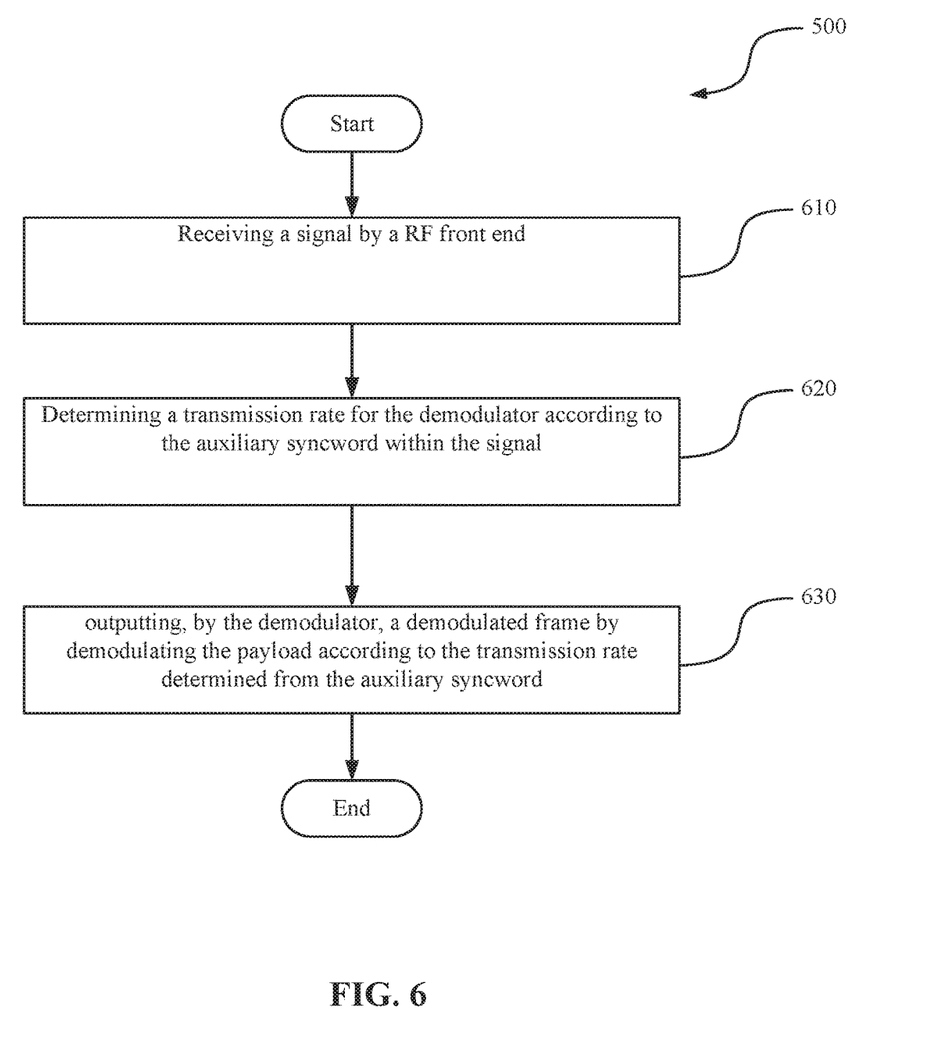
FIG. 6 is a flowchart illustrating a method 600 in a wireless remote receiver according to an embodiment of the invention.

FIG. 6 is a flowchart illustrating a method 600 in a wireless remote receiver according to an embodiment of the invention. The method 600 comprises receiving, by a RF front end in block 610, a signal; determining, by a demodulator communicatively coupled to the RF front, a transmission rate for the demodulator according to the auxiliary syncword within the signal, wherein the transmission rate is variable, and outputting, by the demodulator in block 630, a demodulated frame by demodulating the payload according to the transmission rate determined from the auxiliary syncword, wherein the demodulated frame includes an auxiliary preamble, an auxiliary syncword, a guard, a preamble, an address, a packet control, a payload and a CRC. Variable means the frame includes an auxiliary frame segment with a fixed rate, for example fixed 1 Mbps rate, and a second frame segment with a variable transmission rate chosen from a group for example including 1 Mbps, 4 Mbps and 6 Mbps. The auxiliary frame segment includes the auxiliary preamble, auxiliary syncword and guard. The transmission rate of the second frame segment may be indicated by the auxiliary syncword. For the second frame segment, the transmitter can decide which transmission rate to use according to the size of payload, the Quality of Service (QoS) requirement, current level of traffic of the network, a reliability of the network.

With embodiments of the invention, the conflict between transmission rate and sensitivity may be reconciled. For example, if a high sensitivity (for example, long distance control) is needed, 1 Mbps transmission rate may be used. Note long distance control needs fast response, which requires high sensitivity. Alternatively, if high throughput is needed (for example, for high quality image or video transmission), 4 Mbps or 6 Mbps transmission rate may be used. These different transmission rates can be adaptively switched.

Although the present invention has been described with reference to specific exemplary embodiments, the present invention is not limited to the embodiments described herein, and it can be implemented in form of modifications or alterations without deviating from the spirit and scope of the appended claims. Accordingly, the description and the drawings are to be regarded in an illustrative rather than a restrictive sense.

From the foregoing, it will be appreciated that specific embodiments of the technology have been described herein for purposes of an illustration; however various modifications can be made without deviating from the spirit and scope of the present invention. Accordingly, the present invention is not restricted except in the spirit of the appended claims.

Other variations to the disclosed embodiments can be understood and effected by those skilled in the art in practicing the claimed invention, from a study of the drawings, the disclosure, and the appended claims. In the claims the word "comprising" does not exclude other elements or steps, and the indefinite article "a" or "an" does not exclude a plurality. Even if particular features are recited in different dependent claims, the present invention also relates to the embodiments including all these features. Any reference signs in the claims should not be construed as limiting the scope.

Features and aspects of various embodiments may be integrated into other embodiments, and embodiments illustrated in this document may be implemented without all of the features or aspects illustrated or described. One skilled in the art will appreciate that although specific examples and embodiments of the system and methods have been described for purposes of illustration, various modifications can be made without deviating from the spirit and scope of the present invention. Moreover, features of one embodiment may be incorporated into other embodiments, even where those features are not described together in a single embodiment within the present document. Accordingly, the invention is described by the appended claims.

What is claimed is:

1. A wireless transmitting and receiving system, comprising:
    a wireless transmitter comprising
        a frame generator configured to generate a frame by including an auxiliary preamble, an auxiliary syncword, a guard, a preamble, an address, a packet control, a payload and a CRC, wherein the auxiliary preamble is precedent to the preamble;
        a modulator communicatively coupled to the frame generator and configured to modulate the frame according to a variable transmission rate and include the transmission rate in the auxiliary syncword; and
        a RF front end communicatively coupled to the modulator and configured to transmit the modulated signal to a receiver;
        wherein the frame comprises the auxiliary preamble,
    a receiver comprising a demodulator configured to use the auxiliary preamble to synchronize the demodulator to an incoming bit stream and for frequency offset calculation, and wherein the demodulator is further configured to use the preamble for synchronizing principal demodulation and another frequency offset estimation.

2. The wireless transmitting and receiving system of claim 1, wherein the frame further comprises a guard field, wherein a demodulator of a receiver is configured to use the guard field for rate switch.

3. The wireless transmitting and receiving system of claim 1, wherein the auxiliary syncword comprises 3 bytes, and the auxiliary preamble comprises 1 byte.

4. The wireless transmitting and receiving system of claim 1, wherein the transmission rate of the auxiliary preamble, the auxiliary syncword and the guard is fixed to 1 Mbps.

5. The wireless transmitting and receiving system of claim 1, wherein the transmission rate of the preamble, the address, the packet control, the payload and the error correction is adapt to be selected from 1 Mbps, 4 Mbps or, 6 Mbps.

6. A wireless receiver, comprising:
    a RF front end configured to receive a signal;
    a demodulator communicatively coupled to the RF front, and configured to determine a transmission rate for the demodulator according to the auxiliary syncword within the signal, wherein the transmission rate is variable,
    wherein the demodulator is further configured to output a demodulated frame by demodulating the payload according to the transmission rate determined from the auxiliary syncword, wherein the demodulated frame includes an auxiliary preamble, an auxiliary syncword, a guard, a preamble, an address, a packet control, a payload and a CRC; and
    wherein the demodulator is further configured to use the auxiliary preamble to synchronize the demodulator to an incoming bit stream and for frequency offset calculation, and wherein demodulator is further configured to use the preamble for synchronizing principal demodulation and another frequency offset estimation.

7. The wireless receiver of claim 6, further comprising a calculator communicatively coupled to RF front end,
    wherein the calculator is configured to aid frequency offset calculation and aiding synchronous demodulation by using the auxiliary preamble.

8. The wireless receiver of claim 6,
    wherein the signal further comprises a guard field, wherein the demodulator is configured to use the guard field for rate switch.

9. The wireless receiver of claim 6,
    wherein the syncword comprises 3 bytes, and the auxiliary preamble comprises 1 byte.

10. The wireless receiver of claim 6, wherein each bit in the preamble is encoded using a Gray code.

11. A method, comprising:
generating, by a frame generator, a frame by including an auxiliary preamble, an auxiliary syncword, a guard, a preamble, an address, a packet control, a payload and a CRC;
modulating, by a modulator communicatively coupled to the frame generator, the frame according to a variable transmission rate and including the transmission rate in the auxiliary syncword; and
transmitting, by a RF front end communicatively coupled to the modulator, the modulated signal to a receiver;
using, by a demodulator in a receiver, the auxiliary preamble to synchronize the demodulator to an incoming bit stream and for frequency offset calculation, and
using, by the demodulator the preamble for synchronizing principal demodulation and another frequency offset estimation.

12. The method of claim 11, wherein the transmission rate of the preamble, the address, the packet control, the payload and the error correction is selected from 4 Mbps or 6 Mbps.

* * * * *